United States Patent [19]

Olah

[11] 3,727,156

[45] Apr. 10, 1973

[54] PUSHBUTTON RADIO TUNER DEVICE

[75] Inventor: Emery E. Olah, Des Plaines, Ill.

[73] Assignee: Motorola, Inc., Franklin Park, Ill.

[22] Filed: Feb. 1, 1972

[21] Appl. No.: 222,488

[52] U.S. Cl. .......................................334/7, 74/10.39

[51] Int. Cl. .................................................H03j 5/06

[58] Field of Search ..................334/7, 77; 74/10.27, 74/10.39

[56] References Cited

UNITED STATES PATENTS 3,634,791 1/1972 Yasuda et al..............................334/7

*Primary Examiner*—Eli Lieberman
*Attorney*—Vincent J. Rauner et al.

[57] ABSTRACT

A radio tuner device for a pushbutton radio receiver includes a tuning core assembly mounted on a pair of roller brackets movable along a pair of spaced tracks for changing the radio frequency reception of the radio receiver. An equalizer assembly comprising a rack and gear arrangement, interconnects the brackets to insure equalized movement thereof along respective tracks to provide in turn equalized movement of tuning cores with respect to stationary tuning coils included in the tuning core assembly. A pushbutton actuated memory assembly mounted on a lower plate includes U-shaped clamping springs and associated memory bars, the latter of which are held in preselected locations by the former for positioning the movable core carriage to locations relative to those of the memory bars in response to the depression of corresponding pushbutton mechanisms. The pushbutton mechanisms are mounted on an upper plate and may be lifted to release lever arms incorporated therein which serve to compress the U-shaped clamping springs upon depression of a corresponding pushbutton mechanism from the released position, to permit movement of an associated memory bar to a new location, corresponding to a desired radio frequency setting. Thereafter, upon depression of the pushbutton mechanism, the tuning core carriage is returned to the new location. A unique manual tuning declutch assembly provided in each pushbutton mechanism includes a plate movable in a direction transverse the movement of the pushbutton mechanism in response to the depression of the latter from a normal position, to move a declutch bar in a like direction for disengagement of the manual tuning control mechanism. The declutch assembly is disabled upon depression of the pushbutton mechanism subsequent to releasing the latter for resetting a memory bar. Push-button actuator assemblies mounted on a plate sandwiched between the upper and lower plates are provided to move the core carriage to a position set by a corresponding memory bar. Each pushbutton actuator assembly includes a rack and gear arrangement. Movement of a pair of racks toward each other in response to the depression of an associated pushbutton mechanism clamps a stationary memory bar and the core carriage between respective projections extending from the rack members, moving the core carriage to a position relative to the location of the memory bar.

17 Claims, 16 Drawing Figures

PUSHBUTTON RADIO TUNER DEVICE

BACKGROUND OF THE INVENTION

This invention relates generally to radio tuners and more particularly to pushbutton type radio tuner devices for use in radio receivers mounted in the dashboards of automobiles.

It is desirable in the case of a radio tuner device designed to be used in an automobile radio receiver, that the physical dimensions thereof be as small as possible to maintain the radio receiver small as well, while nevertheless incorporating in the tuner device an accurate pushbutton actuated memory assembly for recalling preselected radio frequencies. This becomes especially important in the case of a tuner device for use in an AM/FM radio receiver wherein the memory assembly accommodates both pre-programmed AM and FM stations.

It is also desirable to include in the radio receiver tuner device, pushbuttons which are easily released for reprogramming the memory assembly when a radio frequency setting is to be changed.

SUMMARY OF THE INVENTION

Accordingly, it is a primary object of the present invention to provide a new and improved pushbutton actuated radio tuner device for use in a radio receiver mounted in an automobile, which is dimensionally compact.

It is yet another object of the present invention to provide a radio tuner device of the above described type including a new and improved pushbutton actuated memory assembly.

It is another object of the present invention to provide a new and improved pushbutton actuated memory assembly which accommodates both AM and FM wavebands.

It is still another object of the present invention to provide in a pushbutton actuated radio tuner device, new and improved pushbutton mechanisms which are easily released for resetting the memory assembly.

Briefly, a preferred embodiment of the radio tuner device according to the invention includes a tuning slug assembly having a plurality of tuning slugs or cores mounted on a carriage including a plurality of roller brackets movable along a pair of spaced tracks. The movement of the carriage changes the positions of the cores with respect to a like number of tuning coils, thereby to alter the radio frequency received by the radio receiver in which the tuner device in incorporated.

A pushbutton actuated memory assembly is provided on a first slide plate movable sidewise to two positions for selecting a desired radio waveband, such as, for example, AM or FM. Mounted on the slide plate is a plurality of U-shaped clamping springs and associated memory bars, the latter of which are movable adjacent the clamping springs to an infinite number of positions representing preselected radio frequencies recalled by the depression of a corresponding pushbutton. Each of the springs cooperates with an associated slide clamp which is actuated by a lever arm arrangement on a corresponding pushbutton to compress the expanded clamping spring to permit movement of an associated memory bar to a selected frequency setting for recall by the depression of the pushbutton.

A pushbutton actuator assembly mounted on a second plate member positioned in an overlying manner with respect to the waveband slide plate and memory assembly is provided to move the core carriage to preselected frequency settings in response to the depression of the pushbuttons. The actuator assembly includes a rack and gear arrangement of the type described in greater detail in co-pending U.S. Pat. application entitled "Differential Motion Magnifying Mechanism," Ser. No. 143,507, filed May 14, 1971, in the name of Emery E. Olah, and assigned to the same assignee as the instant invention. Depression of a pushbutton moves the racks of a corresponding assembly into clamping engagement with the core carriage and associated memory bar to in turn position the core carriage to a location determined by the preset memory bar.

Unique pushbutton mechanism are provided in the radio tuner device according to the invention. Each of the pushbuttons is lifted to release a pair of opposing spring loaded lever arms, which as described heretofore engage a corresponding slide clamp upon depression of the pushbutton to permit an associated memory bar to be moved to a predetermined location representing a preselected radio frequency setting. Once the pushbutton has been depressed subsequent to the release of the lever arms, the latter are folded and returned to their normal position, thereby permitting the slide clamp to return the clamping spring to a normal position into engagement with the memory bars, thereby to maintain the latter in the newly selected position.

Each pushbutton mechanism includes a pushbutton bracket which is connected to an actuator assembly by a spring member. Normally upon depression of the pushbutton, the spring member moves with the pushbutton bracket as a unit to change the frequency setting of the device. If, however, greater than normal force is applied to the pushbutton or to more than one of the pushbuttons, the spring member absorbs a considerable amount of the force applied thereto, thereby preventing damage to the component parts of the tuner device.

Each pushbutton mechanism further includes a pivotal arm member slidable mounted for movement along an S-shaped path. Upon depression of the pushbutton to select a corresponding frequency setting, the moving arm member engages a manual tuner declutch plate provided in the tuner device, thereby moving the declutch plate sidewise with respect to the movement of the pushbutton for disengaging a manual tuning mechanism provided in the radio receiver. Such a manual tuning mechanism is illustrated in co-pending U.S. Pat. application entitled "Manual Tuning Apparatus for Radio Receiver," Ser. No. 143,506, filed May 14, 1971, in the name of Emery E. Olah, and assigned to the same assignee as the subject application.

The pivotal arm member is rendered inoperable when changing frequency settings of respective pushbuttons, thus permitting the manual tuning device to maintain the position of the easily movable core carriage while resetting the memory bar corresponding thereto.

In addition to the above, the radio tuner device according to the invention includes an equalizer assembly having a pair of gears mounted in engagement with a pair of racks provided on the movable core carriage. The equalizer assembly includes a shaft extending across the carriage with the gears mounted at the ends thereof. The equalizer assembly is spring biased into engagement with the carriage assembly and provides a force thereon to control precisely, the movement of the carriage along the tracks provided therefor, to insure accurate recall of the previously selected radio frequency settings.

DETAILED DESCRIPTION

Figures 1, 5, 6, 7, 8:
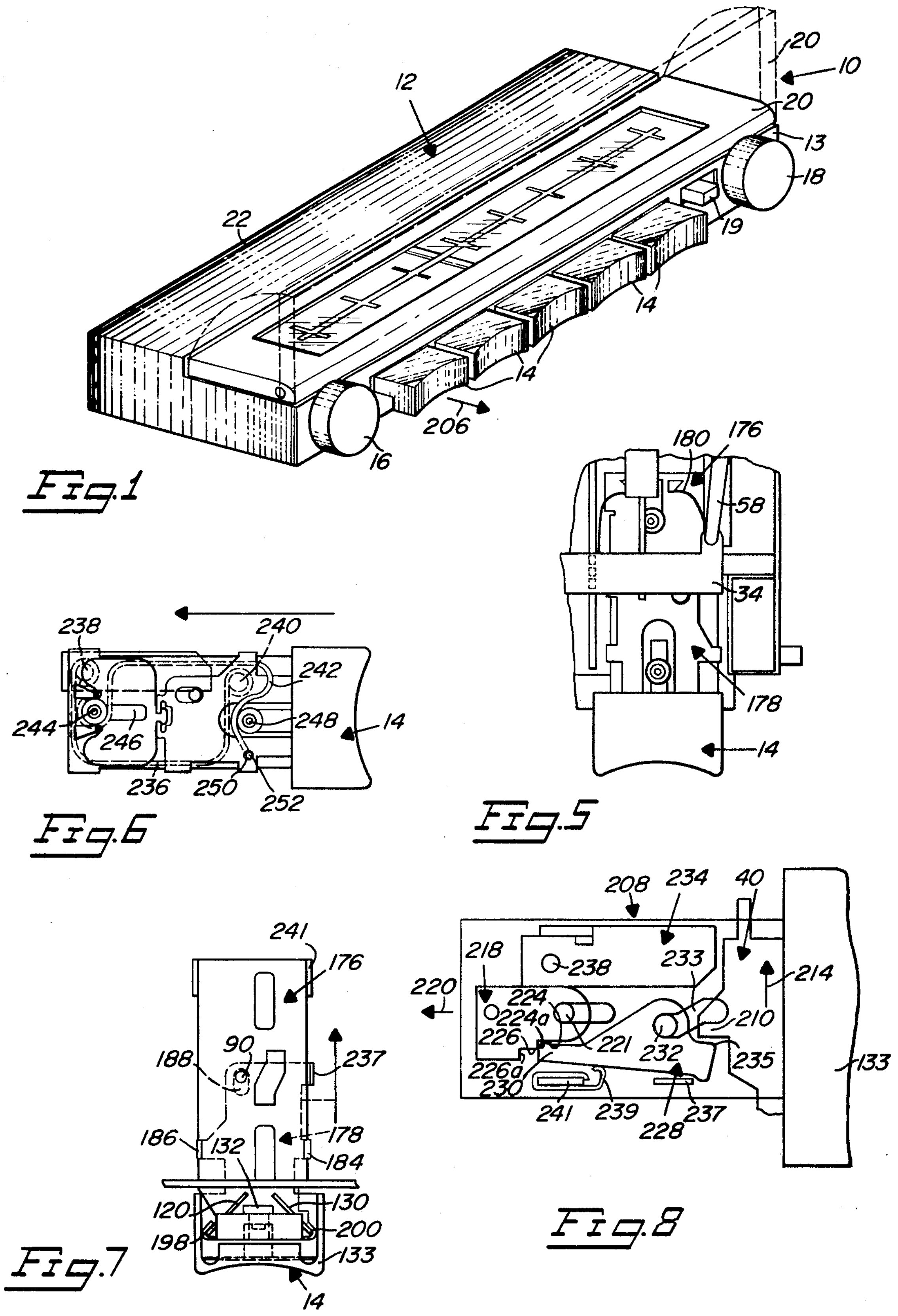
FIG. 1 is a perspective view of a radio receiver including a tuner device according to the invention.
FIG. 5 is an enlarged, top, plan view of the pushbutton assembly of the radio tuner device of FIG. 2.
FIGS. 6 and 7 are top and bottom plan views, respectively, of the pushbutton assembly of FIG. 3.
FIG. 8 is a top plan view of a manual declutch mechanism incorporated into each of the pushbutton assemblies of the radio tuner device according to the invention.

Referring now to the drawings in greater detail wherein like numerals have been employed throughout the various views to designate similar parts, there is illustrated in FIG. 1 a pushbutton type radio receiver, designated generally by the numeral 10 and incorporating thereinto a radio tuner device according to the invention. The radio receiver 10 is of the type to be mounted in a dashboard of an automobile.

The radio receiver 10 includes an outer housing 12. As will be noted, the dimensional height of the radio receiver housing is minimal. The small dimensional height of the radio receiver is attributable to the compactness of the tuning device according to the invention. The radio receiver housing 12 includes a front faceplate 13 through which there extends a plurality of pushbuttons 14 for selecting preset radio frequencies corresponding thereto which are received by the radio receiver. A volume-on/off control knob 16 and a manual tuning knob 18 likewise extend from the faceplate 13 of the housing. In addition, a waveband selector knob 19 is provided to select a desired waveband on which radio frequency signals are to be received.

Because of its compactness, the radio receiver 10 may be mounted in an automobile dashboard beneath a cartridge type stereo player in a space normally occupied by a conventional radio receiver alone. In the latter case, a pivotal dial or indicator plate 20 of the radio receiver 10 serves also as the hinged cover for the cartridge receiving opening in the tape player.

Figure 2:
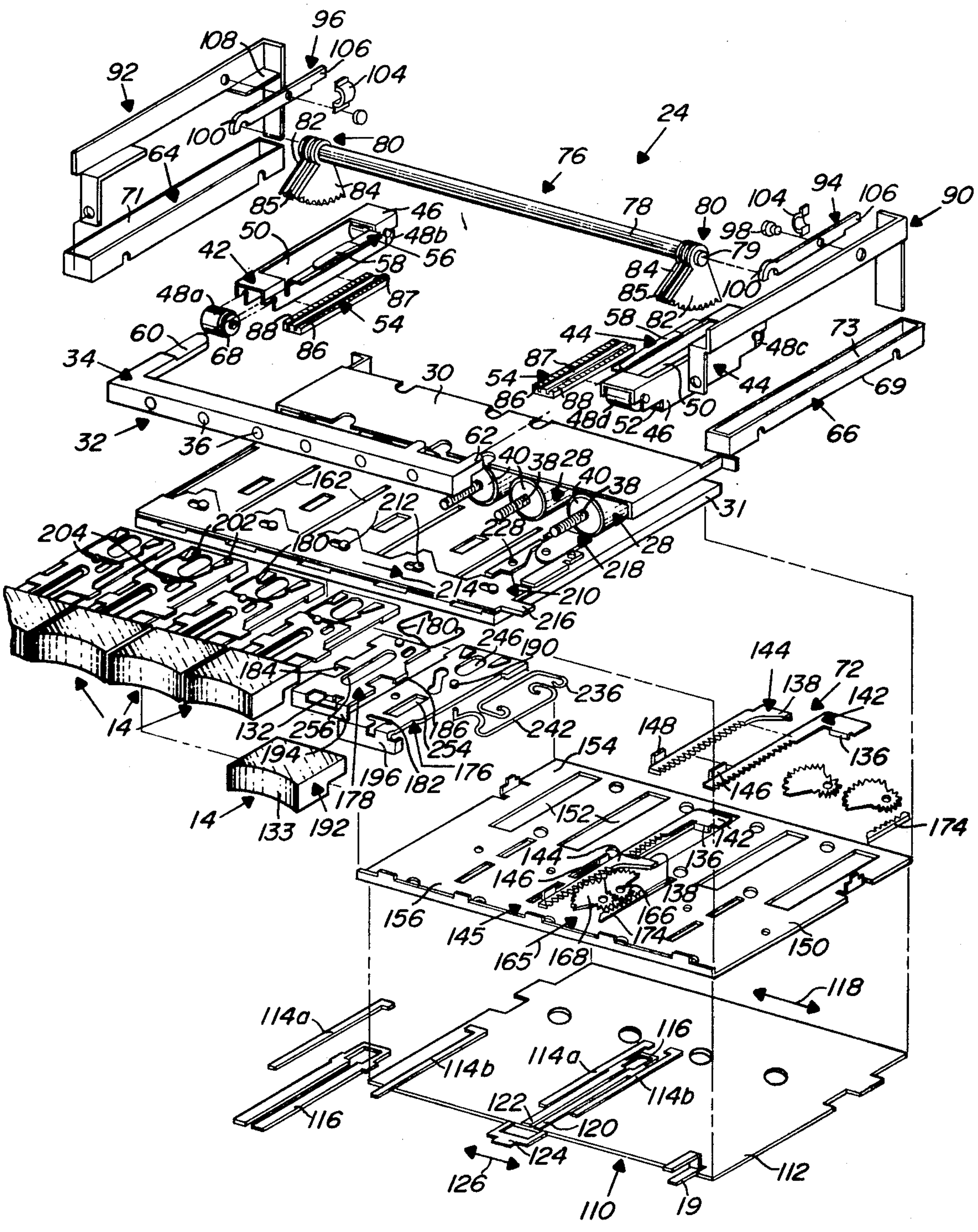
FIG. 2 is an exploded, perspective view of a radio tuner device according to the invention.

A radio tuner device 24 incorporated into the radio receiver 10 of FIG. 1 is shown in an exploded view in FIG. 2 of the drawings.

The radio tuner device 24 of FIG. 2 includes a plurality of tuning coil assemblies 28 mounted in spaced relation between plates 30, 31 extending across the width of the tuner device 24. A tuning core carriage assembly 32 includes a core carrying bar 34 having a plurality of apertures 36 therein through which adjustable tuning screws 38 of tuning cores 40 extend. The cores are mounted for movement within corresponding coil assemblies 28 to change the radio frequency reception of the radio receiver. Movement of the core carrying bar 34 is accomplished through a pair of roller brackets 42, 44 to which the bar is attached. The roller brackets each include a metallic body 46 having two rollers mounted for rotation, at the ends thereof. As will be noted in FIGS. 12 and 13 of the drawings, three of the rollers **48*a*, 48*b*, 48*c* are flanged; i.e., include circumferential ridges along the edges thereof, and one of the rollers, 48*d***, has a flat rolling surface.

Roller tracks or rails 64, 66 are provided at each side of the tuner device upon which rollers **48*a–d* roll to propel brackets 42, 44 when adjusting the position of cores 40 with respect to coils 28. The roller brackets 42, 44 are independently movable along the respective tracks. An opening 50 is provided in each of the brackets between the rollers to receive a gear portion of a motion equalizer assembly to be described hereinafter. An L-shaped lower platform portion 52 of each bracket is provided to receive a rack 54** which is placed in meshing engagement with the equalizer gears upon assembling the tuner device.

Figure 12:
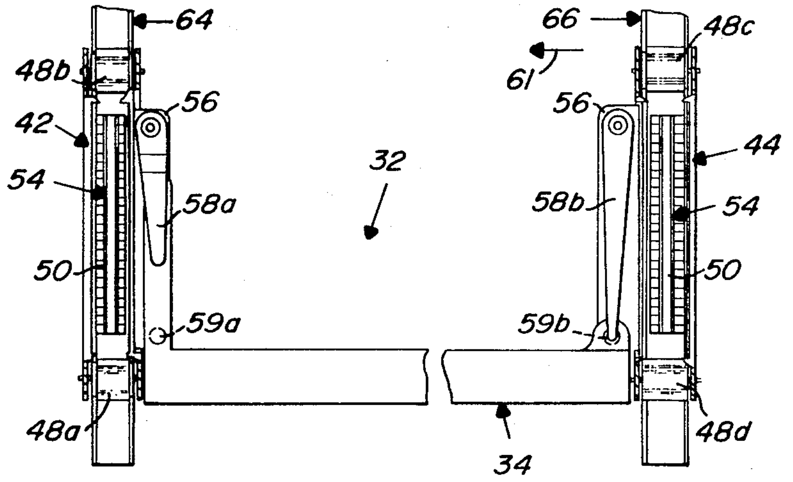
FIG. 12 is an enlarged, top plan view of the tuning core carriage of the tuner device according to the invention.
Figure 13:
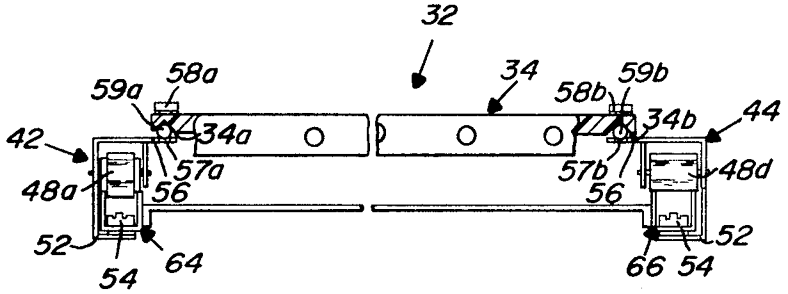
FIG. 13 is a front, partially sectioned view of the core carriage of FIG. 12.

Other platform portions **56*a*, 56*b*, extending from roller brackets 42, 44, are provided for mounting core bar 34 thereon. The aforementioned portions 56*a*, 56*b* are positioned to extend toward each other as shown in FIGS. 12, 13, to permit mounting of core bar 34 between brackets 42, 44**.

In each of the platform portions there is provided a small aperture **57*a*, 57*b*, respectively. The apertures are aligned when the brackets 42, 44 themselves are in alignment on respective rails 64, 66. (See FIGS. 12 and 13). In each aperture there is placed a bearing ball 59*a*, 59*b*. The bearing balls are received in apertures 34*a*, 34*b*, respectively provided in the leg portions 60, 62 of the core bar 34 upon placing the core bar onto brackets 42, 44. The core bar is provided with pivotal play with respect to each of the roller brackets on balls 59***a*, 59*b*, respectively. Spring clip members 58*a*, 58*b*, attached to platform 56*a*, 56*b*, respectively, of the roller brackets, are provided to maintain the core bar held thereto.

Leg 60 of core bar 34 is slidably received beneath spring clip 58*a*. The pressure of the spring clip forces leg 60 into engagement with ball 59*a* received in aperture 34*a* therein. The second leaf spring clip 58*b* which is of a greater length than clip 58*a*, engages core bar leg 62 directly above the ball 59*b*, permitting pivotal movement in bracket 44 about ball 59*b* in the direction of arrow 61, FIG. 12. The flat roller 48*d*, being mounted adjacent ball 59*b*, likewise permits pivotal play in bracket 44 as described.

The left rail as seen in the drawing (FIGS. 12 and 13) upon which flanged rollers 48*a*, 48*b* ride, serves as the reference or guide rail for the core carriage assembly 32. The ball 59*a* serves as a ball joint between the core bar 32 and bracket 42. The attachment of leg 60 of core bar 34 to the bracket 42 as described heretofore, insures that the plane of movement of the core carriage in maintained parallel to the horizontal dimension of the tuner device to prevent binding between the cores and tuning coils while nevertheless permitting some pivotal play in the core bar about ball 59*a*. Likewise, the mounting of leg 62 of core bar 34 on ball 59*b* by clip 58*b*, insures pivotal play of roller bracket 44 about ball 59*a*.

The play or movement provided in the core bar by the above described mounting thereof on brackets 42, 44 lends itself to the usage of the equalizer assembly to be described hereinafter to insure proper movement of the core carriage along rails 64, 66 and thus, proper movement of the cores 40 with respect to tuning coils 28.

Figure 10:
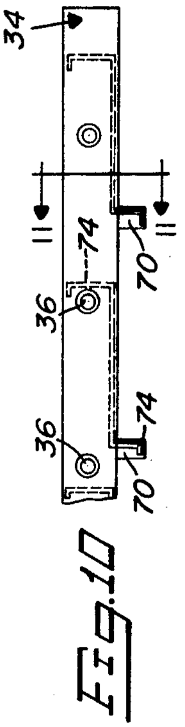
FIG. 10 is a front sectional view of the tuning core carriage bar of the tuner device according to the invention.
Figure 11:
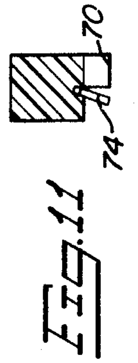
FIG. 11 is a cross sectional view of the core carriage bar of FIG. 10 taken along the line 11—11.

Also, as will be noted in FIG. 10, the core carrying bar 34 includes a plurality of downwardly extending projections 70 formed thereon. The projections are in spaced relation along the bar and are engageable by the ends of clamping racks included in the core carriage driving assemblies, such as 72, which are actuated by the depression of a corresponding pushbutton 14 to move the core carriage to a preselected position. Attached to each projection is a torsion spring 74 which takes up any slack between the clamps and projection to insure positive positioning of the core carriage.

The equalizer assembly designated generally by the numeral 76, is used to insure equal travel or movement of the core carriage ends with minimal play in the direction of core movement, to minimize vertical play of the core carriage and to minimize binding of the core carriage as it is moved between selected positions when depressing a pushbutton or when selecting a new pushbutton setting.

Figure 9:
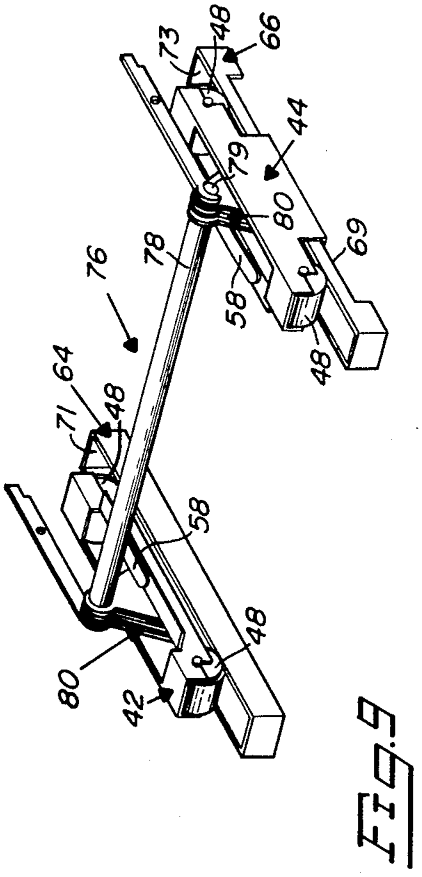
FIG. 9 is a perspective view of an equalizer assembly used in the radio tuner device of FIG. 2.
Figure 15:
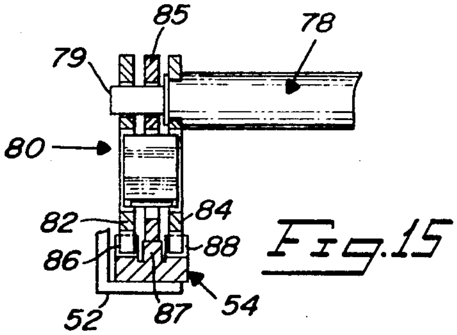
FIG. 15 is a sectional view of the end of the gear carrying shaft of FIG. 14 shown in an assembled condition.
Figure 14:
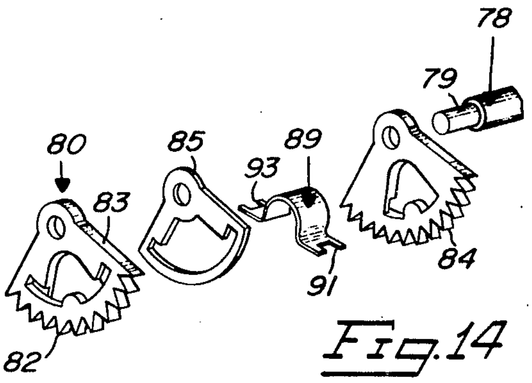
FIG. 14 is an exploded, perspective view of one end of the gear carrying shaft of the equalizer assembly of FIG. 9.

The equalizer assembly as shown in FIGS. 2 and 9 includes a shaft 78 extending between a pair of equalizer gear arrangements, each designated by the numeral 80. Each of the gear arrangements 80 includes a pair of fan-shaped gears 82, 84 (See FIGS. 14 and 15) between which is sandwiched a similarly shaped plate 85 having no gear teeth along the edge thereof. The radius of the center plate is slightly less than that of the gears as measured with respect to the ends of the gear teeth. The inner gear 84 and plate 85 are fastened rigidly to a respective end 79 of the gear shaft 78, while the gear 82 which aids in preventing backlash in movement of the core carriage arrangement, is rotatable with respect to the shaft. The gear 82 is held in substantial alignment with gear 84 by means of a spring member 89 mounted between the gears and within the hollow center 83 of plate 85. The ends 91, 93 of the spring member are attached to gear 84 and 82, respectively.

Figure 16:
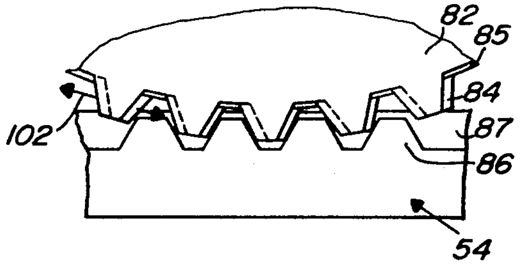
FIG. 16 is an enlarged fragmentary end view of the gear and rack arrangement of the equalizer assembly according to the invention.

The gear arrangements 80 are each mounted as shown in FIG. 9 in meshing engagement with racks 54 mounted on roller brackets 42, 44. The racks 54 each include two rows of outer teeth 86, 88 and a central area or path 87, having no teeth. When assembled, gears 82, 84 mesh with teeth 86, 88 and plate 85 rolls along flat area 87 (See FIG. 16).

Upstanding brackets 90, 92, are mounted on and fastened at each end of the carriage tracks 66, 64, respectively, by rivets (not shown) or other suitable fasteners. On each of the upstanding brackets 90, 92 there is mounted for pivotal movement with respect thereto, a retaining arm 94, 96, respectively. The arms are fastened to the brackets 90, 92 by rivets, such as 98 (FIG. 2). A first end 100 of each of the pivotal arms is curved for engagement with a corresponding end 79 of shaft 78 of the equalizer assembly. Springs 104 are placed between the opposite ends 106 of respective arms 94, 96 and shelf portions 108 on brackets 90, 92, respectively, to bias the ends 100 of the arms into engagement with the ends of shaft 78. The spring tension maintains the equalizer assembly in engagement with racks 54 at all times and in particular to maintain the plates 85 in rolling engagement with central areas 87 of racks 54 thereby to load the carriage so that rollers 48 *a–d* remain on tracks 64, 66.

When in position as described, the equalizer assembly including the spring loaded gear arrangements 80 prevent backlash in the independently movable carriage brackets 42, 44 when selecting a new position for the carriage by depression of the pushbuttons 14. Because the gears 82, 84 of the arrangements 80 of the equalizer assembly are spring biased outwardly or away from each other in a scissors action as indicated by the arrow 102 in FIG. 16, any misalignment in roller brackets 42, 44 is compensated for to insure equal travel of carriage brackets 44, 46 along respective rails. The engagement between central plate 85 and central area 87 of the gear arrangement and racks, respectively, prevents jamming of the gears 82, 84 and the teeth of racks 86, 88, so that smooth travel of the carriage is obtained and aids in eliminating vertical play of the core carriage as well.

The combination of the core carriage assembly 32 and equalizer assembly 76 according to the invention insures the precise movement of the core carrying bar with respect to the tuning coils of the tuner device. Thus, upon depression of any one of the pushbutton members in the radio receiver, one is assured of continually moving the core carriage to an exact frequency location.

Figure 4:
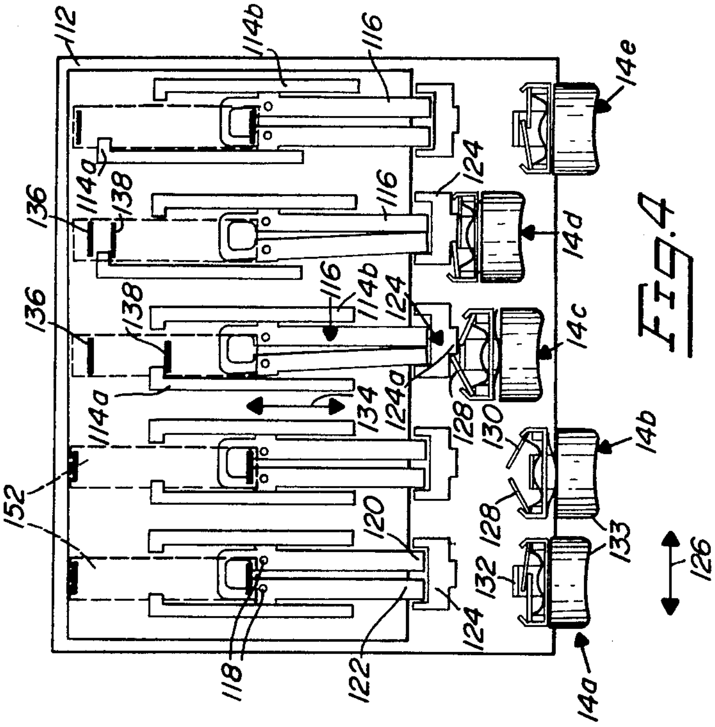
FIG. 4 is a top, plan view of the pushbutton operated memory assembly included in the radio tuner device of FIG. 3.
Figure 3:
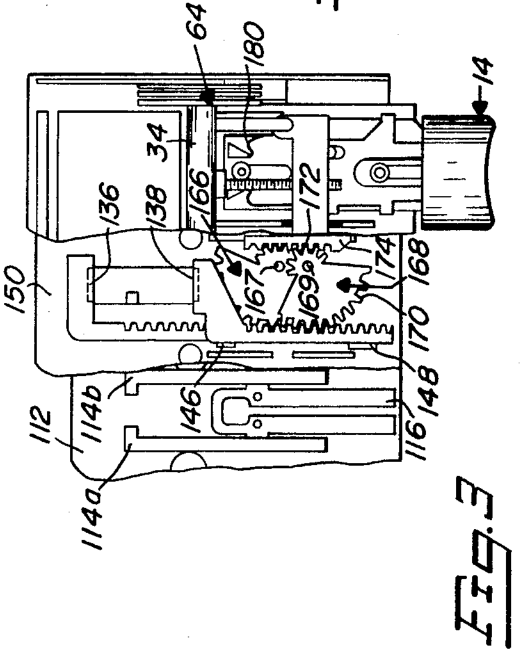
FIG. 3 is an enlarged, fragmentary, sectional, top plan view of the radio tuner device of FIG. 2 illustrating the various component parts incorporated thereinto.

Referring now to FIGS. 2, 3 and 4, a pushbutton operated memory assembly 110 is provided for recalling preselected radio frequency settings in response to the depression of pushbuttons, such as 14.

The memory assembly includes a waveband selector plate 112 upon which is mounted a plurality of slidable L-shaped memory bars 114 and clamping springs 116. In the embodiment of the radio receiver shown, two memory bars are associated with each clamping spring, one bar for each of the wavebands received by the radio receiver. Also, the plate 112 is movable sidewise in the direction of arrow 118 by pivoting knob 19 from side to side to align one of the two bars associated with a selected waveband for engagement with a corresponding pushbutton operated rack and gear mechanism of a pushbutton actuator assembly according to the invention. The action of the pushbutton actuator assembly moves the core carriage to a selected position. In the event the radio receiver is of a single waveband type, only one bar is required. In the latter case, plate 112 is made stationary.

The clamping springs 116, as can be seen, are U-shaped with the legs thereof tensioned normally outwardly or expanded away from each other. The springs are fastened by riveting at two points 118, (See FIG. 4), to plate 112. The bars are positioned adjacent a clamping spring, on each side thereof, and are slidable therealong. The outward tension provided by the clamping springs 116 secures the slidable bars between a respective leg of the spring and a stationary member (not shown) extending along the plate adjacent the memory bars.

Placed at the free ends 120, 122, of the legs of each of the clamping springs 116, is a U-shaped clamp member 124. The clamp member is slidable in the direction of arrow 126 to compress the legs of a corresponding clamping spring 116 together to release the tension or force applied thereby to one or the other of the memory bars, depending upon the waveband selected for adjustment of the recalled radio frequency.

To move the clamp member 124 as described, each of the pushbuttons 14 provided in the radio receiver according to the invention, includes a pair of spring loaded lever arms 128, 130 (FIG. 4) which are held normally within the pushbutton housing portion 133 in an overlapping relation by a tab 132 (See the far left pushbutton 14a in FIG. 4).

A pictoral representation of the sequential operation of of pushbutton of the radio receiver 10 according to the invention is shown in FIG. 4 of the drawings. Upon lifting the housing 133 and tab 132 of the pushbutton, the lever arms are free to expand outwardly as shown in the pushbutton 14*b* in FIG. 4. Subsequent to the release of arms 128, 130, the core carriage is positioned to a selected radio frequency setting. The latter is accomplished normally by turning the manual tuning knob 18 (FIG. 1) which, through instrumentalities (not shown), moves the core bar 34 to position cores 40 with respect to coil assemblies 28, thereby to change the radio frequency received by the radio receiver 10. Once positioned as desired, the pushbutton is depressed, as in the case of the center pushbutton 14c in FIG. 4. Depending upon the positioning of plate 112, the radio frequency selection is made on one or the other of the wavebands. Thus, a corresponding one of the lever arms engages a projection 124*a* extending from clamp member 124. Depression of the pushbutton 14*c* causes the lever arm 128 in the example shown, to force clamp member 124 sidewise (to the right as viewed in FIG. 4) thereby to compress clamping spring 116 so as to permit memory bar 114*a* to be moved slidably along plate 112 in the direction of arrow 134.

As will be seen hereinafter, depression of pushbutton 14c likewise causes a pair of rack members 142, 144 of the pushbutton actuator assembly 145 to be moved toward each other so that the ends 136, 138 thereof clamp the memory bar therebetween to move the bar into an aligned position relative to the position of core bar 34. Projections 146, 148, to be described, extending from the rack members 142, 144, respectively, likewise clamp on a downwardly extending projection 74 of the core bar to direct the movement of memory bar 114*a*. Full depression of the pushbutton accomplishes two things: (1) the memory bar is moved to a position for recall corresponding to the newly selected radio frequency setting; and (2) the lever arms 128, 130 are returned to a locked position in the pushbutton housing 133. Release of the pushbutton reinstates the clamping spring 116 to its tensioned condition, capturing memory bar 114a in its new location. Likewise, rack members 142, 144 are returned to their normal positions. Thereafter, depression of pushbutton 14 returns the core carriage to the selected position corresponding to the desired radio frequency setting.

As mentioned heretofore, a pushbutton actuator assembly 145 is provided for operation by each of the pushbuttons 14 of the radio receiver 10. The pushbutton actuator assembly as described heretofore, includes a pair of rack members 142, 144 mounted on a second plate 150 for sliding movement. The plate 150 overlies plate 112. In the embodiment shown, five pushbuttons are provided, thus, five actuator assemblies are required.

The plate member 150 includes therein five rectangular apertures 152 located along one side 154 thereof. The rack members 142, 144 are mounted on plate 150 in aligned fashion, with rack member 144 overlying rack member 142. The ends 136, 138 of the rack members include projections which extend downwardly through the aperture 152 at opposite ends thereof toward memory bars 114*a*, 114*b*. Thus, movement of the rack members of a particular actuator assembly toward each other, causes a corresponding memory bar to be clamped between the projections on ends 136, 138 thereof. In addition to these last-mentioned projections, the rack members have upwardly extending projections 146, 148, respectively, described heretofore, which are aligned and extend through a respective elongated or slotted aperture 162 in plate 31 upon which the coil assemblies 28 are mounted and which overlies plate 150. Movement of the rack members toward each other likewise causes projections 146, 148 to be moved toward each other to clamp therebetween a corresponding projection 74 extending downwardly from core bar 34 (FIG. 10) to in turn move the core bar as described heretofore.

Two gear members 166, 168, are mounted on pins 167, 169, respectively, for movement on plate 150. Gear member 168 is movable in the direction of arrow 165 while gear member 166 is only rotatable on plate 150. The gear members are each formed of a pair of gear segments of differing radii; the radii of segment 170 of the gears being larger than gear segment 172 thereof. The variation in gear segment radii permits a relatively large linear movement of rack members 142, 144 in response to a relatively short inward movement of pushbutton 14. A third rack member 174 meshes with both the small radius gear segments of gear members 166, 168. Inward movement or depression of a pushbutton causes gear 168 to be moved inwardly to mesh gears 166, 168 with rack members 142, 144, 174, causing the clamping movement of racks 142, 144 as described. For a more detailed description of the operation of the pushbutton actuator assembly, the reader's attention is drawn to co-pending U.S. Pat. application, Ser. No. 143,507, in the name of Emery E. Olah, and assigned to the same assignee as the instant invention.

Referring now to FIGS. 2, 6 and 7 in particular, it can be seen that each of the pushbutton mechanisms employed in the radio receiver 10 according to the invention includes a pair of L-shaped spring steel members 176, 178, the latter of which overlies the other with the shorter legs of the L's being adjacent each other. A pair of curved fingers 184, 186 extending outwardly from the sides of member 178 wrap about member 176 so that the latter members are slidable with respect to each other. A tab 132 described heretofore, extends downwardly from the shorter member 178 and into an aperture 182 provided in the larger member 176. A slot 188 formed in member 178 receives a pin 190 extending from member 176 to limit the sliding movement of the two members with respect to each other. The pushbutton housing or head portion 133 described above, is received over the end 194 of member 178 and is attached thereto. The end 196 of member 176 is slidable into and out of the head or housing portion 133.

A pair of spring-like lever arms 128, 130 described heretofore, are wedged under opposing curved tabs !98, 200 (FIG. 7) extending from member 176. When the members 176, 178 are in a normally closed position with tab 132 being received in aperture 182, the tab likewise captures lever arms in a position in housing 133 wherein one lever arm is folded over the other. Lifting upwardly (FIG. 2) in the direction of arrow 192 on the housing portion 133 and thus member 176, causes tab 132 to be lifted out of aperture 182 permitting a C-shaped spring member 180 connected at the ends of the legs of the C to tabs 202 formed on member 176 and to a pin 204 on member 178, to move member 178 forward (See arrow 206, FIG. 1) with respect to member 176. Forward movement of member 178 releases lever arms 128, 130 so they spring to a position shown in FIG. 7 or as illustrated by pushbutton assembly 14*b* of FIG. 4. The latter steps are performed when one is desirous of changing a corresponding, recallable frequency setting for one of the pushbutton mechanisms of the radio receiver as described above.

Included in each of the pushbutton assemblies according to the invention is a manual tuner declutch mechanism designated generally by the numeral 208 (FIG. 8). The declutch mechanism is provided for moving a declutch plate 210 mounted on plate 31 by means of rivets 212 beneath the pushbutton assemblies, in the direction of arrow 214 to engage, at end 216 thereof, instrumentalities in a manual tuning device (not shown) to render the latter inoperable. In this manner any turning of knob 18 during the depression of a pushbutton 14 does not affect the positioning of the core bar 34.

The declutch mechanism, as shown in FIG. 8, includes a plate 218 fastened to plate 31 by pins 220, 221. One side surface of plate 218 is shaped to provide first and second stepped surfaces 224, 226, respectively. A second plate 228 is mounted adjacent plate 218 with one end 230 thereof positioned for alignment with the surfaces 224, 226, and engagement with surfaces 224a, 226a, respectively. The last-mentioned plate 228 is slidably attached by pin 232 to member 176 of the pushbutton mechanism in S-shaped slot 233 formed therein. The opposite end 235 of the plate 228 is positioned for engagement with declutch plate 210 and for engagement with tab 237 of member 178. A small spring 239 mounted on a downwardly extending tab 241 of member 176 engages plate member 228 to bias the latter into contacting engagement with the stepped surfaces 224*a* or 226*a* of plate 218.

A third plate 234, is positioned adjacent plate 228 and, as will be explained hereinafter, cooperates with an accumulator spring 236 (FIGS. 2 and 6) connected at one end thereto at pin 238. The opposite end of the spring 236 is connected at pin 240 (FIG. 6) of member 176 of the pushbutton mechanism.

A second spring 242 serving as a pushbutton return spring is attached at one end to a post 244 extending from plate 31. The post passes through a slot 246 in member 176 also. The opposite end of return spring 242 is curved about a second post 248 and the free end 250 thereof is received in an aperture 252 in member 176 (FIG. 6) the second post is also received in aligned elongated apertures 254, 256 in members 176, 178.

Operation of the pushbutton mechanism is as follows:

When it is desired to recall a frequency setting in the radio receiver, the housing portion 133 is pushed inwardly toward the receiver, moving the members 176, 178 as a unit along posts 244, 248. Movement of the pushbutton causes plate 228 which is in engagement normally with plate 218, to travel along S-shaped slot 233. The end 235 of plate 228 thus engages declutch plate 210 moving the latter in the direction of arrow 214 to disable the manual tuner (not shown). In addition to the above, inward movement of the pushbutton causes, through accumulator spring 236, plate 234 to be moved inwardly as well. The last-mentioned plate is connected at the center 169 of gear member 174 of the pushbutton actuator assembly. The movement of the plate likewise moves gear 168 inwardly to mesh with racks 144, 174. The latter in turn causes gear 166 to be rotated and to mesh with rack 142, 174 and thus, the ends 136, 138 of the rack members move toward each other to clamp therebetween an associated memory bar 114a or 114b, depending upon the selection of wavebands. At the same time, projections 146, 148 of rack members 142, 144 are moved together to clamp therebetween core bar 34, to move the last-mentioned core bar to a position corresponding to the position set by the memory bar.

When it is desired to set the memory bar corresponding to one of the pushbutton assemblies to a new frequency setting on a selected waveband, the waveband selector knob 19 is pivoted to move the plate 112 to the desired setting, (FIG. 2), thereby to align either memory bar 114*a* or 114*b* with a corresponding aperture 152 in plate 150. Next, through the use of manual tuning knob 18, the core bar is moved to a preferred position so that the radio receiver is tuned to a desired frequency setting on the selected waveband.

Subsequent to selecting the radio frequency setting desired, the associated pushbutton head portion or housing 133 is lifted in the direction of arrow 192 (FIG. 2) to permit lever arms 128, 130 to spring outwardly as in FIG. 4. Thereafter the pushbutton is depressed to free up the memory bar and to move the latter by means of rack members 142, 144, to a position corresponding to the position of core bar 34. The core bar is held in the selected position by maintaining the connection between the manual tuning mechanism (not shown) and the core carriage assembly. To accomplish the latter, the declutch plate 210 is prevented from being moved to declutch the manual tuning mechanism.

Operation of the pushbutton mechanism to prevent declutching is as follows. Referring to FIG. 8, it can be seen that upon lifting head portion 133 to permit the movement of member 178 outwardly from the radio receiver, tab 237 thereof engages end 235 of plate 228. The last-mentioned plate 228 is thereby pivoted in a counterclockwise direction as seen in FIG. 8 so that end 230 thereof aligns with step 226 of plate 218 rather than step 224. Thus, upon depression of the pushbutton subsequent to releasing head portion 133, the plate 228 is moved along S-shaped slot 233 but because it has been rotated, the end 230 thereof engages surface 226a to permit end 235 of plate 228 to pass by declutch plate 210 without engaging or moving the latter.

Movement of the pushbutton inwardly moves the memory bar to a selected frequency setting as described heretofore, and also forces members 176, 178 into locking engagement, i.e., tab 132 is received in aperture 182, to recapture the now folded lever arms in head portion 133. Thereafter, upon depression of the pushbutton, core bar 34 will be returned by projections 146, 148 to a position corresponding to the newly set position of the associated memory bar.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A radio tuner device for a pushbutton type radio receiver including in combination; a tuning core assembly including a plurality of stationary tuning coils and a plurality of cores movable with respect to corresponding ones of said coils for altering the wave signal reception of said radio receiver, movable carriage means to which said movable cores are attached for simultaneous movement with respect to said coils, a plurality of pushbutton mechanisms, each mounted for movement between a neutral position, and released and depressed positions, each for moving said core carriage to a predetermined location to cause said cores to assume predetermined positions with respect to said coils, memory bar means associated with each pushbutton mechanism, each said memory bar means positionable at a location whereat said core carriage means is to be moved relative thereto in response to the depression of a corresponding pushbutton mechanism, a plurality of core carriage driving mechanisms one of which is associated with each said pushbutton mechanism, each said driving mechanism being engageable with said core carriage means and an associated memory bar means for moving said core carriage means into position relative to said memory bar means upon depression of a corresponding pushbutton, and a plurality of memory assemblies for relocating a corresponding memory bar means to change the preselected wave signal reception of said radio receiver corresponding to each of said pushbutton mechanisms, each said memory assembly comprising a U-shaped clamping spring adjacent which said memory bar means is mounted for maintaining said memory bar means at said predetermined location, said clamping spring being normally expanded to hold the associated memory bar means in position and compressed upon movement of said pushbutton mechanism from said released to said depressed position to permit movement of said memory bar means into position with respect to said core carriage means, and said clamping spring being expanded for re-engagement with said memory bar means subsequent to the movement of said pushbutton mechanism from said depressed position to said neutral position thereafter.

2. A radio tuner device as claimed in claim 1 wherein each said memory assembly further includes a clamp member mounted for movement with respect to the legs of said U-shaped clamping spring for engagement therewith, and wherein each said pushbutton mechanism includes a lever arm normally captured within said pushbutton mechanism and being spring biased outwardly therefrom, said lever arm being freed upon moving said pushbutton mechanism to a released position and upon subsequently depressing said pushbutton said lever arm engaging said clamp member to move the latter for compression of said clamping spring, thereby to free said memory bar means for movement, said lever arm being recaptured in said pushbutton mechanism upon returning the latter to said neutral position.

3. A radio tuner device as claimed in claim 2 wherein each said pushbutton mechanism includes first and second bracket members, the first overlying the second, said first member being slidable with respect to and being spring biased away from said second member, said first member including a tab received in an aperture in said second member to lock said members together against the tension of said biasing spring, and wherein said lever arm is mounted on said second member and held normally in said captured position by said tab, said first and second bracket members being separable to remove said tab from said aperture, thereby to release said lever arm and to permit the movement of said first member away from said second member.

4. A radio tuner device as claimed in claim 3 wherein each of said pushbutton mechanisms is mounted for movement on a first plate member and wherein said core carriage driving mechanisms are mounted on a second plate member positioned adjacent said first member, each said core carriage driving mechanism and a corresponding pushbutton mechanism being interconnected through an aperture provided in said first plate member so that movement of said pushbutton mechanism operates said core carriage driving mechanism, each said core carriage driving mechanism including first and second member movable toward and away from each other in response to the movement of said pushbutton mechanism from said neutral to said depressed position and vice versa, each said member including first projections extending through an aperture in said first plate member for clamping engagement with said core carriage, whereby upon depression of one of said pushbutton mechanisms, first projections of a corresponding one of said core carriage driving mechanisms moves said core carriage to a preselected position.

5. A radio tuner device as claimed in claim 4 wherein said core carriage includes a torsion spring member mounted therein on one side thereof for engagement with one of said first projections, said torsion spring member absorbing the clamping force of said projections to ensure proper positioning of said core carriage upon depression of a pushbutton mechanism.

6. A radio tuner device as claimed in claim 4 wherein said memory assemblies and memory bar means are mounted on a third plate member positioned adjacent said second plate member on the side thereof opposite said first plate member, and wherein each said core carriage driving mechanism includes second projections extending through apertures in said second plate member for clamping engagement with respective ones of said memory bar means, whereby upon depression of one of said pushbutton mechanisms, said second projections engage a corresponding stationary memory bar means to in turn limit the movement of said first projections in positioning said core carriage to said preselected position.

7. A radio tuner device as claimed in claim 4 wherein each said pushbutton mechanism includes a spring member interconnecting said pushbutton mechanism and a corresponding core carriage driving mechanism, said spring member normally transmitting force applied against said pushbutton mechanism to said core carriage driving mechanism to move the latter for changing the position of said core carriage and absorbing excessive force applied to said pushbutton mechanism to minimize damage to said core carriage driving mechanism.

8. A radio tuner device as claimed in claim 7 wherein each said pushbutton mechanism includes a second spring member connected thereto and to said first plate member, said last-mentioned spring member being compressed upon depression of said pushbutton mechanism and expanded upon removal of force from said pushbutton mechanism, to return said pushbutton mechanism to said neutral position.

9. A radio tuner device as claimed in claim 4 wherein said pushbutton type radio receiver further includes a manual tuning control mechanism for manually positioning said core carriage and wherein said tuner device includes a manual tuner mechanism declutch member movable into engagement with said manual tuning control mechanism for disabling the latter during depression of any of said pushbutton mechanism, said declutch member being slidably mounted on said first plate member for movement in a direction transverse the direction of said pushbutton mechanisms, each said pushbutton mechanism having a plate mounted thereon for movement along an S-shaped path in response to the depression of said pushbutton mechanism, said plate being moved into engagement with said declutch plate upon depression of said pushbutton mechanism from said neutral position to move said declutch plate into engagement with said manual tuning mechanism.

10. A radio tuner device as claimed in claim 9 wherein each said pushbutton mechanism includes a second plate mounted adjacent said first-mentioned plate, said second plate having a stepped surface for engagement with said first-mentioned plate, said first-mentioned plate normally engaging a first step portion of said surface, whereby upon depression of said pushbutton from said neutral position, said first-mentioned plate is moved into engagement with said declutch member, and upon moving said pushbutton mechanism to said released position prior to depression of said pushbutton mechanism, said first-mentioned plate engages said second step portion, whereby upon depression of said pushbutton mechanism said first-mentioned plate avoids engagement with said declutch member.

11. A radio tuner device as claimed in claim 1 wherein said tuning core assembly includes a pair of brackets, each having a pair of rollers, and a pair of tracks upon which said brackets are mounted in rolling engagement, said core carriage means being mounted on said brackets and being movable therewith, and wherein each of said core carriage driving mechanisms includes projection means engageable with said core carriage means and said memory bar means for moving said core carriage means relative to said memory bar means upon depression of a corresponding pushbutton.

12. A radio tuner device as claimed in claim 11 further including an equalizer assembly for controlling the movement of said roller brackets carrying said core carriage, said equalizer assembly including a pair of rack members one of which is mounted on each of said roller brackets, and an equalizer shaft having mounted at each end thereof gear means, each said gear means being in meshing engagement with one of said rack members, whereby movement of one of said roller bracket members is imparted through said shaft to the other roller bracket member to equalize the extend of travel of said brackets along said tracks, thereby to change the position of said cores with respect to said coils, substantially equally.

13. A radio tuner device as claimed in claim 12 wherein each said gear means of said equalizer assembly comprises a pair of gear members one of which is mounted rigidly on said shaft and the other of which is mounted for rotation with respect to said shaft, a roller plate mounted on said shaft between said gear members and having a radius slightly less than said last-mentioned gear members and a spring member mounted between said gear members within said roller plate, said spring member coupled to both said gear members and being tensioned outwardly tending to move said gear members away from each other in a scissors action, and wherein each said rack member comprises a pair of outer tooth tracks for meshing engagement with said first and second gear members of said equalizer assembly, respectively, and a central flat area for rolling engagement with respect to said roller plate, said spring member between said gear member is providing correct alignment of said gear members and tooth tracks on said rack members while maintaining said cores and coils in proper alignment and said roller plate and flat area preventing jamming of said gear members and tooth tracks as the latter mesh.

14. A radio tuner for a pushbutton type radio receiver, including in combination:

first, second and third mounting plates, said second mounting plate being sandwiched between the first and third plates, a tuning core assembly including a plurality of stationary tuning coils mounted on said first plate and a plurality of cores movable with respect to corresponding ones of said coils for altering wave signal reception of said radio receiver, a core bar to which said cores are attached, a pair of brackets each having rollers and a pair of tracks upon which said brackets are mounted for rolling engagement, said core bar being mounted between said brackets for movement therewith, a plurality of pushbutton mechanisms, each for moving said core bar to a different preselected location for changing the radio frequency reception of said radio receiver, said pushbutton mechanisms being mounted on said first plate member and each being movable from a neutral to a depressed position in a first direction, a plurality of memory means each including a U-shaped clamping spring, one associated with each pushbutton mechanism, and memory bars, at least one of which is associated with each of said clamping springs, said clamping springs and memory bars being mounted on said third plate member, with the former being normally expanded to capture corresponding memory bars at a preselected location adjacent thereto, and a plurality of pushbutton actuator means mounted on said second plate member, one of said pushbutton actuator means associated with each of and connected to a corresponding one of said pushbuttons, each said pushbutton actuator means including first and second members movable toward and away from each other in response to the depression of a corresponding pushbutton mechanism, said members including first projections extending through apertures provided in said first plate member for clamping engagement with said core bar and second projections extending in an opposite direction from said first projections through apertures provided in said second plate member for clamping engagement with a memory bar, whereby upon depression of one of said pushbutton mechanisms, said first and second members of an associated pushbutton actuator means are moved toward each other to move said core bar to a location determined by the location of a corresponding memory bar, thereby to change the radio frequency reception of said receiver.

15. A radio tuner as claimed in claim 14 wherein each said clamping spring includes a pair of memory bars associated therewith, said memory bars being positioned on opposite sides of said clamping spring, first ones of said pairs of said memory bars being associated with a first radio waveband on which radio frequency signals are received by said radio receiver and second ones of said pairs of said memory bars being associated with a different radio waveband, and wherein said third plate member is movable transverse the direction of movement of said first and second members of said pushbutton actuator means for aligning one of said memory bars of each of said memory means for engagement by said second projections in said first and second members of a corresponding pushbutton actuator means, thereby to permit movement of said core bar to different locations for different radio wavebands as determined by corresponding memory bars.

16. A radio tuner as claimed in claim 15 wherein each said pushbutton mechanism includes first and second interconnected bracket members, the first of which is movable with respect to the second and is spring biased away from said second member, said bracket members including means for locking said members together against the force of the biasing spring, wherein each of said pushbutton mechanisms includes a pair of opposing spring biased lever arms, normally held in a folded position within said pushbutton mechanism and being releasable to an extended position upon release of said locking means thereby to permit movement of said first bracket member away from said second bracket member and wherein upon depression of one of said pushbutton mechanisms, subsequent to the release of said lever arms, one of said corresponding lever arms is moved to compress an associated clamping spring, thereby to permit movement of a corresponding one of said memory bars to a new position.

17. A radio tuner as claimed in claim 14 wherein said first and second members of each of said pushbutton actuator means comprises a rack member and wherein each of said pushbutton actuator means further includes a first gear mounted for rotation about a fixed axis, a second gear similar to said first gear connected to a corresponding pushbutton mechanism at the axis of the former for movement with the latter, the axis of said gears being substantially parallel to each other, and a third rack member mounted for meshing engagement with each of said gears on one side thereof, and said first and second rack members each being mounted in meshing engagement with one of said gears on the side thereof opposite said first rack for movement along a common path, whereby upon depressing a corresponding one of said pushbutton mechanisms, said first and second rack members are moved toward each other whereby said first projections are moved into clamping engagement with said core bar and said second projections are moved into clamping engagement with a corresponding memory bar.

* * * * *